United States Patent
Piscart

[19]

[11] Patent Number: 5,942,853

[45] Date of Patent: *Aug. 24, 1999

[54] AUTOMATIC HIGH BEAM HEADLIGHT DEVICE RESPONSIVE TO VEHICLE OPERATING CONDITIONS

[75] Inventor: Bernard Piscart, Rottenburg, Germany

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/786,435

[22] Filed: Jan. 21, 1997

[30] Foreign Application Priority Data

Feb. 1, 1996 [DE] Germany ............ 196 03 529

[51] Int. Cl.[6] .................................. B60Q 1/08
[52] U.S. Cl. ................ 315/82; 315/79; 307/10.8
[58] Field of Search ...................... 315/79, 82; 307/10.8; 340/466

[56] References Cited

U.S. PATENT DOCUMENTS

| | | | |
|---|---|---|---|
| 1,954,806 | 4/1934 | Falge et al. ............ | 307/10.8 X |
| 2,087,029 | 7/1937 | Gordon .................. | 307/10.8 X |
| 3,171,058 | 2/1965 | Ono ....................... | 315/82 X |
| 4,007,365 | 2/1977 | Stempfle et al. ........ | 362/283 |
| 4,105,898 | 8/1978 | Farler et al. ........... | 315/82 X |
| 5,349,267 | 9/1994 | Brassier et al. ......... | 307/10.8 X |
| 5,400,226 | 3/1995 | Hogrefe ................. | 362/61 |

FOREIGN PATENT DOCUMENTS

| | | |
|---|---|---|
| 41 00 411 A1 | 7/1992 | Germany . |
| 57-44542 | 3/1982 | Japan ....................... 315/82 |

*Primary Examiner*—Robert Pascal
*Assistant Examiner*—Justin P. Bettendorf
*Attorney, Agent, or Firm*—Michael J. Striker

[57] ABSTRACT

The high beam headlight includes a reflector (10) and a light source (12) containing two or more light emitting bodies (20,22). The reflector (10) and the light emitting bodies (20,22) are formed so that reflected light from one light emitting body (20) forms a concentrated or focused high beam issuing from the light source and reflected light from another light emitting body (22) forms a horizontally widened high beam due to horizontal scattering. A control device is provided so that the light emitting bodies (20,22) can either be operated simultaneously or one at a time according to vehicle operating conditions including the condition of the road in front of the vehicle. For example, the high beam formed by energizing only the one light emitting body (22) can be used to form the widened high beam at low vehicle speed, while the light beam formed by energizing only the other light emitting body (20) can be used to form the narrower high beam at high vehicle speed.

6 Claims, 2 Drawing Sheets

AUTOMATIC HIGH BEAM HEADLIGHT DEVICE RESPONSIVE TO VEHICLE OPERATING CONDITIONS

BACKGROUND OF THE INVENTION

The present invention relates to a high beam headlight device for a vehicle comprising a light source and a reflector.

A high beam headlight is known and is described in German Published Patent Application DE 41 00 411 A1. This headlight has a light source and a reflector. The light source has a light emitting body and the reflector has two different parts, by which light issuing from the light emitting body of the light source is reflected differently. The light is reflected by one reflector part as a horizontally scattered beam and by the other reflector part as a concentrated light beam with lesser scatter and longer range. The light beam emitted by the high beam headlight thus has the characteristics of both sufficient horizontal scattering and also sufficient range. The light beam issuing from the headlight is however only a compromise, since these characteristics are not optimum for all traffic, usage and/or weather conditions.

SUMMARY OF THE INVENTION

It is an object of the present invention to provide an improved high beam headlight device of the above-described type, which suffers less from the above-described disadvantage.

According to the invention, the light source in the high beam headlight device has at least two light emitting bodies and means for operating the at least two light emitting bodies, either together(i.e. at the same time) or alternately, and means for forming different light beams having different characteristics from each light emitting body.

The high beam headlight device according to the invention has the advantage that the characteristics of the light beam issuing from the high beam headlight can be changed in a simple way by controlled operation of the different light emitting bodies of the light source. Thus the operation of the high beam headlight can be adjusted to fit different traffic conditions, usage and/or weather conditions.

Many embodiments of the high beam headlight device according to the invention are possible. In one preferred embodiment the reflector of the headlight and the at least two light emitting bodies are formed so that the light beam formed from light reflected by the reflector from one of the two light emitting bodies is concentrated into a narrow beam and the light beam formed from light reflected by the reflector from another light emitting body is widened by horizontal scattering, i.e. is a horizontally scattered beam.

Advantageously the high beam headlight device can include control means for automatically switching operating states of the headlight device, e.g., by switching the light emitting bodies on or off according to at least one control means-detected vehicle operating condition. They can be operated alternately or turned on or off at the same time. The control-means detected operation condition can be the vehicle speed, the condition of the road ahead of the vehicle or a weather condition, such as the visibility or road wetness.

BRIEF DESCRIPTION OF THE DRAWING

The objects, features and advantages of the invention will now be illustrated in more detail with the aid of the following description of the preferred embodiments, with reference to the accompanying figures, in which.

DESCRIPTION OF THE PREFERRED EMBODIMENTS

Figure 1:
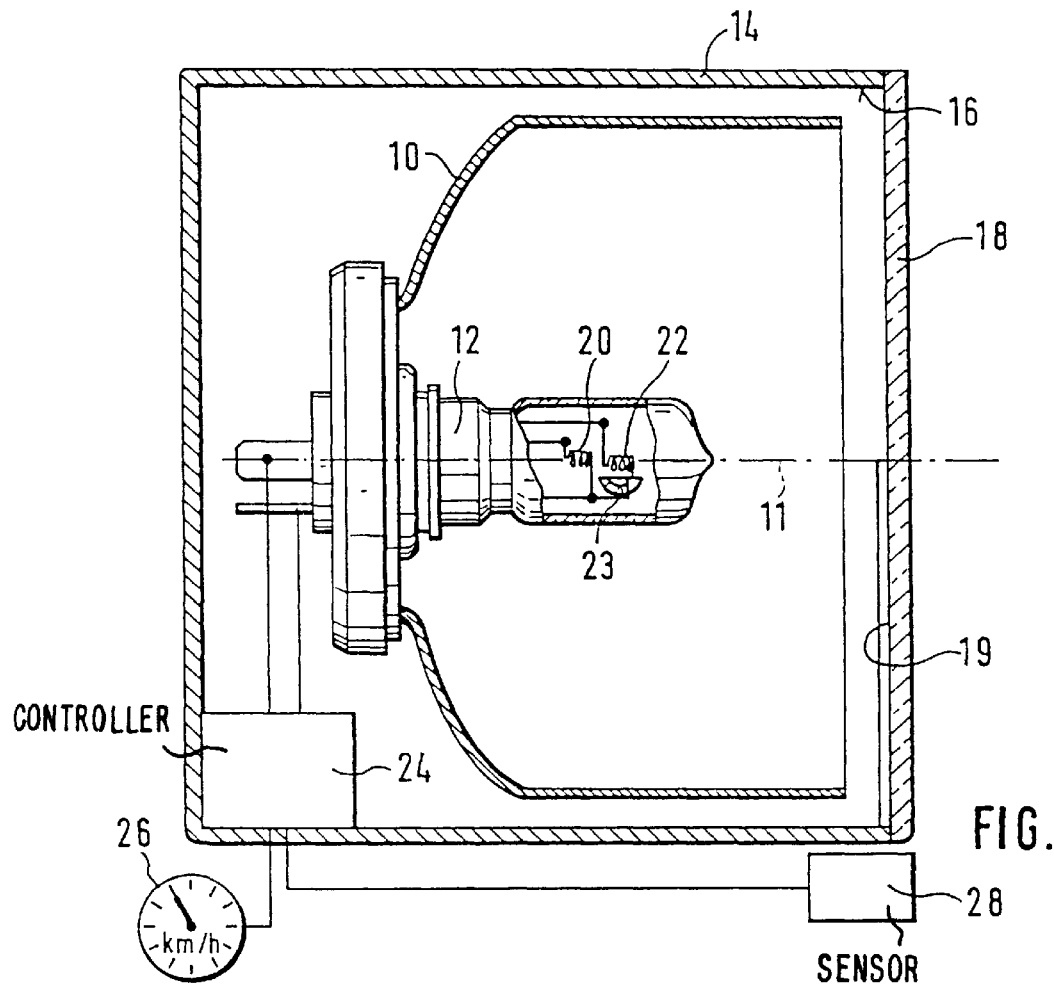
FIG. 1 is a simplified vertical cross-sectional view through a high beam headlight device for a vehicle according to the invention.

The high beam headlight for a vehicle, especially for a motor vehicle, shown in FIG. 1, comprises a reflector 10 in which a light source 12 is arranged. The high beam headlight shown in the drawing is purely a high beam headlight so that the vehicle must be equipped with another special headlight, namely a low beam headlight. The reflector 10 of the high beam headlight can be made of metal or plastic and is arranged in a housing 14, which is covered with a light permeable disk 18. The light source 12 can be a gas-discharge lamp or an incandescent lamp. The light permeable disk 18 can be a smooth disk, so that light issuing from the light source 12 and light reflected by the reflector 10 passes through it without being effected or modified by it. The light permeable disk 18 can also have at least one optical element 19, by which light reflected from the reflector 10 is modified when passing through the light permeable disk 18, which means scattered or deflected in a predetermined direction. The light permeable disk 18 can be made of glass or plastic material.

The light source 12 has at least two light emitting bodies 20,22, which are formed by two spiral filaments in an incandescent lamp and two light emitting arcs in a gas discharge lamp. If a gas discharge lamp is used, it has at least three electrodes, wherein at least one electrode is arranged on one side and at least two electrodes are arranged opposite to it and the light emitting arcs appear between the at least one electrode on one side and the at least two electrodes opposite thereto when a voltage is applied across these electrodes. Also at least two electrodes could be arranged on each side of the gas discharge lamp. The light emitting arcs then appear between the at least two electrodes on opposite sides of the lamp when a voltage is applied across each group of electrodes.

The light emitting bodies 20,22 of the light source 12 can be arranged transverse to the optic axis 11 of the headlight or, as shown in FIG. 1, approximately or substantially parallel to the optic axis 11. A commercially obtainable, so-called H4 lamp can be used, for example, as the light source 12, which has two spiral filaments acting as the light emitting bodies 20,22, which can be displaced relative to each other in the direction of the optic axis 11. The spiral filament 22 arranged spaced further from the peak of the reflector 10 has a screening cap 23 associated with it. The incandescent lamp 12 can be set in any arbitrary rotational position in the reflector 10 so that the screening cap 23 can be under, over or laterally positioned relative to the spiral filament 22. Also any other incandescent lamp with at least two spiral filaments 20,22 can be used.

The light emitting bodies 20,22 of the light source 12 are displaced spatially relative to each other, so that they are located in different positions relative to the reflector 10. The shape of the reflector 10 is designed so that light issuing from the different light emitting bodies 20,22 is reflected by it to form different light beams with different characteristics. The reflector 10 can have portions of different shape, for example different upper and lower regions. The shape of the reflector is designed for a predetermined arrangement of light emitting bodies 20,22 according to the optical reflection laws, so that the light issuing from the reflector 10 by reflection of the light issuing from the light emitting bodies 20,22 has the desired characteristics. These light beams issuing from the high beam headlight can be further modified by optical elements in the light permeable disk 18 as already mentioned above.

Figure 2:
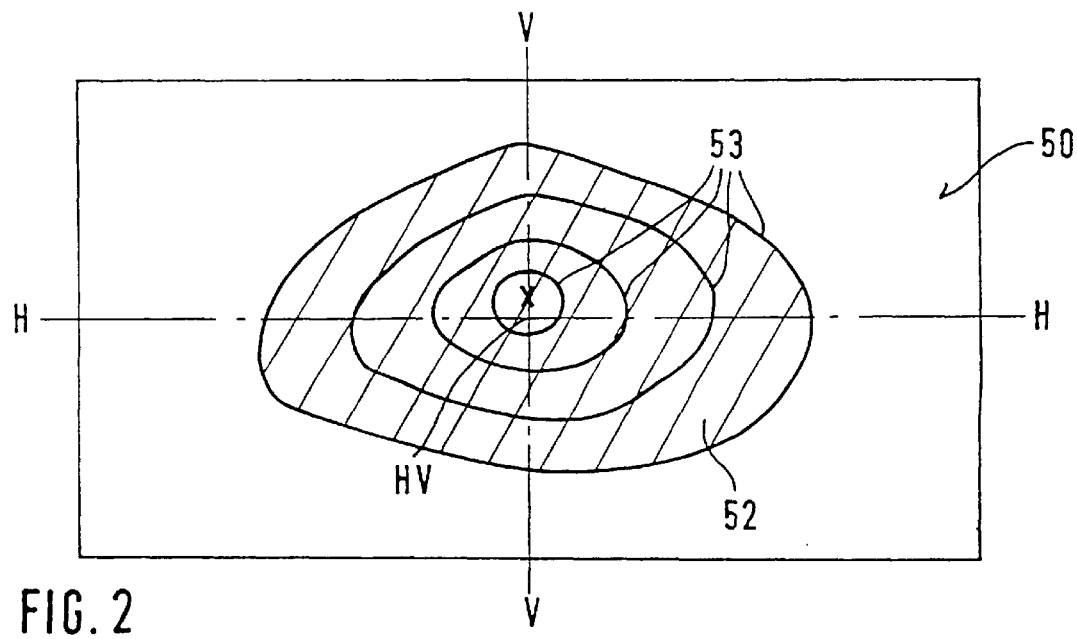
FIG. 2 is a diagram showing a light distribution of a beam from the high beam headlight device impinging on a screen in front of the high beam headlight with the high beam headlight in a first operating state.

The shape of the reflector 10 can, for example, be designed so that light issuing from one of the light emitting bodies of the light source 12, for example, light emitting body 20, can be reflected as a concentrated light beam, which has a comparatively long range and a comparatively reduced scatter. In FIG. 2 a measuring screen 50 is arranged perpendicular to this optic axis 11 and spaced from the high beam headlight, which represents the projection of a travel path arranged in front of the high beam headlight. The horizontal central plane of the measuring screen 50 is indicated with HH its vertical central plane is indicated with VV. The optic axis 11 of the high beam headlight passes substantially through the intersection point HV of the horizontal central plane HH and the vertical central plane VV of the measuring screen. The measuring screen 50 is illuminated by a light beam issuing from the high beam headlight during operation of the light emitting body 20, which is concentrated or focused substantially on the center of the measuring screen 50. The region 52 extends above and below the horizontal central plane HH and on both sides of the vertical central plane VV. The behavior of the illumination intensity in the region 52 is indicated by the lines of equal illumination intensity, the so-called isolux lines 53, in FIG. 2. The highest light intensity values are present in the center portion of region 52 and are marked with an "x". They are somewhat above the point HV. The illumination intensities values drop off rapidly toward the edges of the region 52. Thus above all the distant region of the road in front of the high beam headlight is illuminated by the light beam, while the closer region and the lateral edge regions of the road are not or only weakly illuminated.

Figure 3:
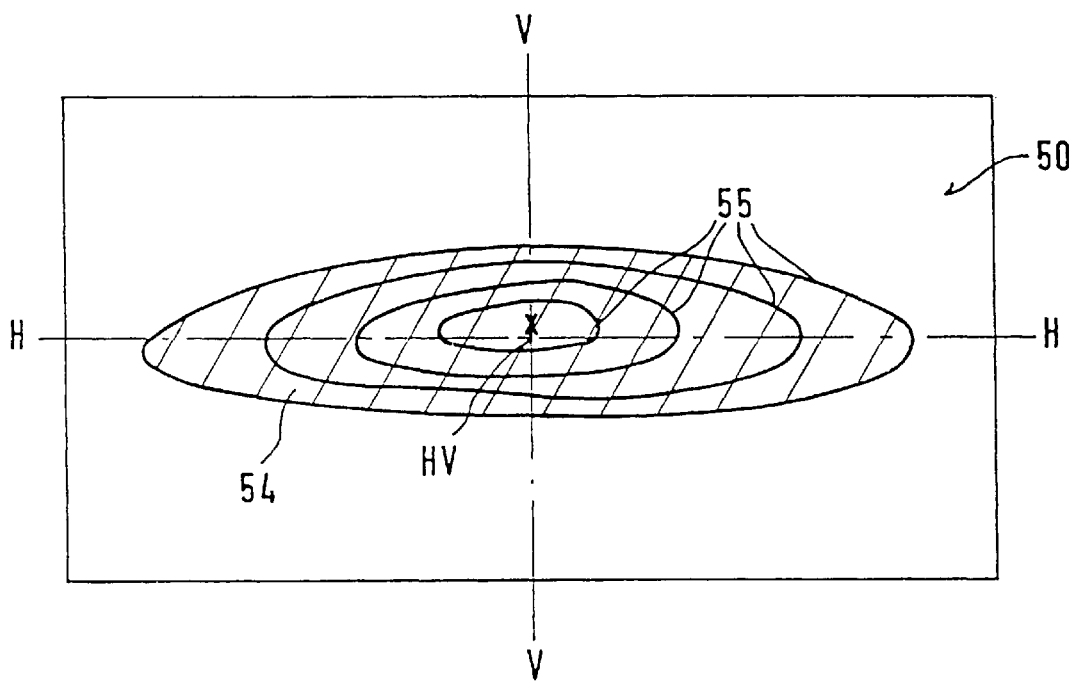
FIG. 3 is a diagram showing a light distribution of a beam from the high beam headlight on a screen in front of the high beam headlight with the high beam headlight in a second operating state.

The light issuing from the other light emitting body 22 of the light source is reflected by the reflector 10 as a horizontally scattered light beam or comparatively wider light beam widened by horizontal scattering. The image of the light produced by illumination of the measuring screen 50 with the light beam from the high beam headlight during operation of the light emitting body 22 is shown in FIG. 3. A region 54 of the measuring screen 52 is illuminated, which has a greater width in a horizontal direction than that in region 52 of FIG. 2. In the vertical direction the region 54 can have about the same or a somewhat greater extent than the corresponding region 52, above all under the horizontal plane HH of the measuring screen 50. The behavior of the illumination intensity in the region 54 is again indicated by the isolux lines 55, in which lower intensity values are present at the center of the region 54 marked with "x" in FIG. 3 near the HV point than the corresponding center of region 52. However the illumination intensity strength decreases to the edges of this region 54, above all toward the lateral edges somewhat less rapidly than in the corresponding region 52 of FIG. 2. The distant region of the road is thus illuminated comparatively weakly by the light emitting body 22 during its operation in comparison to the illumination by the light emitting body 20 during its operation, however the lateral edges of the road and the side regions beside the road are illuminated more strongly. Moreover the illumination of the road at the average distance from the high beam headlight is increased by this light beam when the region 54 extends further under the horizontal central plane HH of the measuring screen 50. Both light emitting bodies 20,22 of the light source 12 can be operated simultaneously, whereby the regions 52 and 54 are partially superimposed on the measuring screen 40 or increased illumination intensities are present in this overlapped region.

Advantageously the light beam from the high beam headlight in each operating state, which means during operation of the light emitting body 20 and also during operation of the light emitting body 22, has characteristics, which means direction, scatter and illumination intensity distribution, such that legal requirements for a headlight are satisfied. The changes of the characteristics of the light beam emitted in the different operating states must comply with the legal requirements.

Both light emitting bodies 20,22 of the light source 12 may be operated only alternately. In another additional operating state both light emitting bodies 20,22 can be operated simultaneously so that both of the above-mentioned light beam overlap. Understandably more than two light emitting bodies may be provided which may be each put into operation. The reflector 10 can be formed so that light issuing from the different light emitting bodies as a light beam is reflected from it with different characteristics which means scatter and direction.

A change of operating state of both light emitting bodies 20,22 of the light source 12 and/or their joint operation can, for example, take place by operation of a manually operated switch element operated by the vehicle driver according to his subjective impressions. Alternatively, the change of operating state of both light emitting bodies 20,22 of the light source 12 and/or their joint operation occurs by a controller 24, by which operating conditions of the vehicle are detested and the change of operation of the light emitting bodies 20,22 is caused according to the detected conditions.

The vehicle speed, for example, can be detected as a vehicle operating condition when signals from a tachometer 26 are fed to the controller 24. Advantageously when a low vehicle speed is detected by the controller 24 the light emitting body 22 is operated so that the light beam issuing from the high beam headlight has a comparatively wide scatter and illuminates a wide portion of the road in front of the vehicle and side regions next to the road so that objects located in the road are sufficiently discernible by a vehicle driver. With a high vehicle speed either the light emitting body 22 is shut off by the controller 24 and instead the light emitting body 20 is turned on, or the light emitting body 20 is turned on in addition to the light emitting body 22. Because of that the region of the road in front of the vehicle is illuminated with a comparatively high illumination intensity so that the vehicle driver can sufficiently discern obstructions possibly present comparatively far from the vehicle ahead of the vehicle. The change of operating state of the light emitting bodies 20,22 made by the controller 24 can, for example, occur at a threshold of from about 100 km/hr to 140 km/hr. A hysteresis can be provided in the controller action, so that the change of operating state occurs at higher vehicle speed during an increase of vehicle speed and again at lower vehicle speed during a decrease of vehicle speed. Continuous changes of operating state with changing vehicle speed can be avoided by the hysteresis in the control, when it changes only slightly in a vehicle speed range, in which the changes would occur with only a fixed threshold.

Alternatively or in addition to the signal from the tachometer 26 signals from one or more sensors 28 are fed to the controller 24 by which additional vehicle operating conditions are detected. The condition of the road in front of the vehicle can, for example, be detected by a sensor 28. Advantageously the light emitting body 22 is operated by the controller 24 when a curved region and/or narrower region of the road is detected, so that a scattered light beam is produced by the high beam headlight. The light emitting body 20 however is advantageously operated on a substantially straight and/or wide region of the road so that a concentrated light beam is provided by the high beam headlight.

Alternatively or additionally to the embodiments described above, the weather conditions can be detected by at least one sensor 28, for example, whether the road ahead is dry or wet or the visibility conditions, which means whether or not fog is present and how far one can see, i.e. the visual range. The light emitting bodies 20,22, whose issuing light is reflected by the reflector 10 as a light beam with suitable characteristics, are controlled and operated by the controller 24 according to the signals from the at least one sensor 28. When dry conditions and good visibility are present, the light emitting body 20 is advantageously operated so that the high beam headlight generates a concentrated beam. During wet conditions and poor visibility the light emitting body 22 is operated so that the high beam headlight produces a scattered beam.

The subject matter of German Patent Application 1 96 03 529.5 of Feb. 1, 1996, is incorporated here by reference. A claim of priority under 35 U.S.C. 119 for the above-described invention is based on this German Patent Application.

While the invention has been illustrated and described as embodied in a high beam headlight for a vehicle, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

I claim:

1. A high beam headlight device for a vehicle comprising:
a light source (12) provided with at least two light emitting bodies (20,22);
means for operating said at least two light emitting bodies (20,22) simultaneously;
means for operating said at least two light emitting bodies (20,22) alternately;
means (10) for forming different high beams having different high beam characteristics from light emitted from different ones of said at least two light emitting bodies (20,22), wherein said means for forming said different high beams includes a reflector (10), and said reflector (10) and said at least two light emitting bodies (20,22) are formed so that each of said different high beams having said different high beam characteristics are generated when said light from each of said at least two light emitting bodies (20,22) is reflected by the reflector (10); and
control means (24) for controlling both of said means for operating said at least two light emitting bodies (20,22) so as to either operate said at least two light emitting bodies with said means for operating said at least two light emitting bodies (20,22) simultaneously or to operate said at least two light emitting bodies with said means for operating said at least two light emitting bodies alternately,
wherein said control means (24) includes means for automatically controlling both of said means for operating so that said at least two light emitting bodies (20,22) are switched between operating states according to at least one control means-detected vehicle operating condition, and
wherein said at least one control means-detected vehicle operating condition is a characteristic of weather conditions in front of the vehicle.

2. The high beam headlight device as defined in claim 1, wherein said reflector (10) and said at least two light emitting bodies (20,22) are formed so that one of said high beams formed from said light reflected by said reflector (10) from one (20) of said at least two light emitting bodies (20,22) is a comparatively concentrated high beam and another of said high beams formed from said light reflected by the reflector (10) from another (22) of said at least two light emitting bodies (20,22) is comparatively widened by horizontal scattering.

3. A high beam headlight device for a vehicle comprising:
a light source (12) provided with at least two light emitting bodies (20,22);
means for operating said at least two light emitting bodies (20,22) simultaneously;
means for operating said at least two light emitting bodies (20,22) alternately;
means (10) for forming different high beams having different high beam characteristics from light emitted from different ones of said at least two light emitting bodies (20,22), wherein said means for forming said different high beams includes a reflector (10), and said reflector (10) and said at least two light emitting bodies (20,22) are formed so that each of said different high beams having said different high beam characteristics are generated when said light from each of said at least two light emitting bodies (20,22) is reflected by the reflector (10); and
control means (24) for controlling both of said means for operating said at least two light emitting bodies (20,22) so as to either operate said at least two light emitting bodies with said means for operating said at least two light emitting bodies (20,22) simultaneously or to operate said at least two light emitting bodies with said means for operating said at least two light emitting bodies alternately,
wherein said control means (24) includes means for automatically controlling both of said means for operating so that said at least two light emitting bodies (20,22) are switched between operating states according to at least one control means-detected vehicle operating condition, and
wherein said at least one control means-detected vehicle operating condition is a wetness of a region in front of the vehicle.

4. The high beam headlight device as defined in claim 3, wherein said reflector (10) and said at least two light emitting bodies (20,22) are formed so that one of said high beams formed from said light reflected by said reflector (10) from one (20) of said at least two light emitting bodies (20,22) is a comparatively concentrated high beam and another of said high beams formed from said light reflected by the reflector (10) from another (22) of said at least two light emitting bodies (20,22) is comparatively widened by horizontal scattering.

5. A high beam headlight device for a vehicle comprising:
- a light source (12) provided with at least two light emitting bodies (20,22);
- means for operating said at least two light emitting bodies (20,22) simultaneously;
- means for operating said at least two light emitting bodies (20,22) alternately;
- means (10) for forming different high beams having different high beam characteristics from light emitted from different ones of said at least two light emitting bodies (20,22), wherein said means for forming said different high beams includes a reflector (10), and said reflector (10) and said at least two light emitting bodies (20,22) are formed so that each of said different high beams having said different high beam characteristics are generated when said light from each of said at least two light emitting bodies (20,22) is reflected by the reflector (10); and
- control means (24) for controlling both of said means for operating said at least two light emitting bodies (20,22) so as to either operate said at least two light emitting bodies with said means for operating said at least two light emitting bodies (20,22) simultaneously or to operate said at least two light emitting bodies with said means for operating said at least two light emitting bodies alternately,
- wherein said control means (24) includes means for automatically controlling both of said means for operating so that said at least two light emitting bodies (20,22) are switched between operating states according to at least one control means-detected vehicle operating condition, and
- wherein said at least one control means-detected vehicle operating condition is visibility ahead of the vehicle.

6. The high beam headlight device as defined in claim 5, wherein said reflector (10) and said at least two light emitting bodies (20,22) are formed so that one of said high beams formed from said light reflected by said reflector (10) from one (20) of said at least two light emitting bodies (20,22) is a comparatively concentrated high beam and another of said high beams formed from said light reflected by the reflector (10) from another (22) of said at least two light emitting bodies (20,22) is comparatively widened by horizontal scattering.

* * * * *